(12) United States Patent
Han et al.

(10) Patent No.: US 11,393,393 B2
(45) Date of Patent: Jul. 19, 2022

(54) DISPLAY DEVICE AND METHOD FOR OPERATING DISPLAY DEVICE

(71) Applicant: Samsung Display Co., Ltd., Yongin-Si (KR)

(72) Inventors: Dong Kwan Han, Hwaseong-si (KR); Sung Chun Park, Suwon-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/321,235

(22) Filed: May 14, 2021

(65) Prior Publication Data
US 2022/0093040 A1  Mar. 24, 2022

(30) Foreign Application Priority Data
Sep. 23, 2020 (KR) .................. 10-2020-0123186

(51) Int. Cl.
G09G 3/3225 (2016.01)
H02M 3/158 (2006.01)

(52) U.S. Cl.
CPC ... *G09G 3/3225* (2013.01); *G09G 2310/0264* (2013.01); *G09G 2320/0233* (2013.01); *G09G 2340/0435* (2013.01); *H02M 3/1582* (2013.01)

(58) Field of Classification Search
CPC ............... H02M 3/1582; G09G 2340/0435
See application file for complete search history.

(56) References Cited

U.S. PATENT DOCUMENTS

| 10,218,266 | B2* | 2/2019 | Park | G06F 3/147 |
| 2006/0050037 | A1* | 3/2006 | Maki | G09G 3/3688 345/89 |
| 2009/0115501 | A1* | 5/2009 | Chiang | G09G 3/20 327/538 |
| 2010/0127672 | A1* | 5/2010 | Chen | H05B 45/38 323/222 |
| 2013/0241808 | A1* | 9/2013 | Kwon | G09G 3/3233 323/284 |
| 2014/0118414 | A1* | 5/2014 | Seo | H02M 3/156 345/82 |

(Continued)

FOREIGN PATENT DOCUMENTS

| KR | 10-2010-0018256 A | 2/2010 |
| KR | 10-2018-0065063 A | 6/2018 |

(Continued)

*Primary Examiner* — Sepehr Azari
(74) *Attorney, Agent, or Firm* — Innovation Counsel LLP

(57) ABSTRACT

A display device and an operating method of the display device are provided. The display device may include: a first transistor controlled by a first control signal to connect an input terminal to which an input voltage is applied and a first node; a second transistor controlled by a second control signal to connect a second node to which a power supply voltage is outputted and the first node; an overcharge recognition circuit configured to receive a first reference voltage, a feedback voltage, and a second reference voltage, to determine whether it is overcharged, and to output an overcharge recognition signal; and a discharge circuit configured to provide a first discharge path for discharging the power supply voltage based on an enable signal generated depending on the overcharge recognition signal.

20 Claims, 14 Drawing Sheets

(56) References Cited

U.S. PATENT DOCUMENTS

| | | | | |
|---|---|---|---|---|
| 2015/0061540 A1* | 3/2015 | Park | ................... | H05B 45/60 |
| | | | | 315/294 |
| 2016/0049872 A1* | 2/2016 | Park | ................... | H02M 3/158 |
| | | | | 345/212 |
| 2016/0125791 A1* | 5/2016 | Park | ................... | H02M 3/1584 |
| | | | | 345/76 |
| 2018/0212513 A1* | 7/2018 | Park | ................... | H02M 3/156 |
| 2021/0074205 A1* | 3/2021 | Lee | ................... | G09G 3/3225 |

FOREIGN PATENT DOCUMENTS

| | | | |
|---|---|---|---|
| KR | 10-2018-0087920 A | 8/2018 |
| KR | 10-2009322 B1 | 8/2019 |
| KR | 10-2061554 B1 | 1/2020 |
| KR | 10-2131307 B1 | 7/2020 |

* cited by examiner

| ELVSS_Ref Digital Code | Sub DAC | ELVSS Value |
|---|---|---|
| 000 | 00 | -4 |
| 001 | 11 | |
| | 10 | |
| | 01 | |
| | 00 | -4.05 |
| 010 | 11 | |
| | 10 | |
| | 01 | |
| | 00 | -4.1 |
| 011 | 11 | |
| | 10 | |
| | 01 | |
| | 00 | -4.15 |
| 100 | 11 | |
| | 10 | |
| | 01 | |
| | 00 | -4.2 |
| 101 | 11 | |
| | 10 | |
| | 01 | |
| | 00 | -4.25 |
| 110 | 11 | |
| | 10 | |
| | 01 | |
| | 00 | -4.3 |
| 111 | 11 | |
| | 10 | |
| | 01 | |
| | 00 | -4.35 |

FIG. 8

| User Register | Register Name | Addr | Default | Initialize by Canna | BIT | | | | | | | | Operation |
|---|---|---|---|---|---|---|---|---|---|---|---|---|---|
| | | | | | 7 | 6 | 5 | 4 | 3 | 2 | 1 | 0 | |
| | VCT | 0xNN | 0X05 | O | x | x | x | x | VCT_Falling [3:2] | | VCT_Rising [1:0] | | R/W |

| Register Name | Bit3 | Bit2 | VCT Falling_50mV(us) |
|---|---|---|---|
| VCT_Falling | 0 | 0 | 20 |
| | 0 | 1 | 35 |
| | 1 | 0 | 70 |
| | 1 | 1 | 105 |

| Register Name | Bit1 | Bit0 | VCT Rising_50mV(us) |
|---|---|---|---|
| VCT_Rising | 0 | 0 | 20 |
| | 0 | 1 | 35 |
| | 1 | 0 | 70 |
| | 1 | 1 | 105 |

DISPLAY DEVICE AND METHOD FOR OPERATING DISPLAY DEVICE

CROSS-REFERENCE TO RELATED APPLICATION

This application claims priority to and benefits of Korean Patent Application No. 10-2020-0123186, filed in the Korean Intellectual Property Office on Sep. 23, 2020, the entire contents of which are incorporated herein by reference.

BACKGROUND

Field

The present disclosure relates generally to a display device and an operating method of a display device. More particularly, the present disclosure relates to a display device capable of ameliorating visual recognition of a change in luminance of a screen.

Description of the Related Art

Flat panel displays such as a liquid crystal display, a plasma display, and an electroluminescent display are being developed. In particular, the electroluminescent display may be driven with a fast response speed and low power consumption by using a light emitting diode (LED) or an organic light emitting diode (OLED) that generates light by recombination of electrons and holes.

The organic light emitting diode includes an anode, a cathode, and an emission layer between the anode and cathode, and emits light depending on a current flowing from the anode to the cathode. In the electroluminescent display, emission luminance is determined depending on a driving current flowing through the organic light emitting diode of each pixel, and a high luminance image requires a larger drive current than a low luminance image.

The above information disclosed in this Background section is only for enhancement of understanding of the background of the described technology, and therefore it may contain information that does not form the prior art that is already known in this country to a person of ordinary skill in the art.

SUMMARY

The described technology has been made in an effort to provide a display device and an operation method thereof, capable of ameliorating visual recognition of a change in luminance of a screen due to a change in voltage when a power supply voltage ELVSS is discharged.

The described technology has been made in an effort to provide a display device and an operation method thereof, capable of varying a discharge rate of the power supply voltage ELVSS.

An example embodiment provides a display device including: a first transistor controlled by a first control signal, wherein the first transistor is to connect an input terminal to which an input voltage is applied and a first node; a second transistor controlled by a second control signal, wherein the second transistor is to connect a second node to which a power supply voltage is outputted and the first node; an overcharge recognition circuit configured to receive a first reference voltage, a feedback voltage, and a second reference voltage, in order to determine whether a circuit is overcharged, and to output an overcharge recognition signal; and a discharge circuit configured to provide a first discharge path for discharging the power supply voltage based on an enable signal which is generated depending on the overcharge recognition signal.

The display device may further include an enable signal generation circuit configured to generate the enable signal by performing a logic operation on the overcharge recognition signal and an ELVSS high signal.

The overcharge recognition circuit may include: an error amplifier configured to amplify a difference between the first reference voltage and the feedback voltage in order to output an error amplification output signal; and a comparator configured to output the overcharge recognition signal by comparing a voltage level of the error amplification output signal and a voltage level of the second reference voltage.

When the voltage level of the feedback voltage is higher than the voltage level of the first reference voltage, the circuit may be determined as an overcharge state to lower the voltage level of the amplification output signal, and the comparator may output the overcharge recognition signal when the voltage level of the amplified output signal is lower than the voltage level of the second reference voltage.

The display device may further include an inductor connected to the first node, a discharge speed of the power voltage may be controlled by the operation of the discharge circuit when a panel load is within a predetermined range, and may be controlled by adjusting charging and discharging times of the inductor when the panel load is outside the predetermined range.

A plurality of intermediate target voltage levels may be set between a current voltage level of the power supply voltage and a target voltage level of the power supply voltage, and discharging the power supply voltage may be repeatedly performed depending on the intermediate target voltage levels.

The intermediate target voltage levels may be set by using an upper level code and a lower level code.

The display device may further include: a third transistor controlled by a third control signal, wherein the third transistor is to connect the second node to a ground terminal; and a resistor configured to provide a second discharge path through the third transistor based on the enable signal.

An example embodiment provides a display device including: a first transistor controlled by a first control signal, wherein the first transistor is to connect an input terminal to which an input voltage is applied and a first node; a second transistor controlled by a second control signal, wherein the second transistor is to connect a second node to which a power supply voltage is outputted and the first node; an overcharge recognition circuit configured to receive a reference voltage and a feedback reference voltage, in order to determine whether a circuit is overcharged, and to output an overcharge recognition signal; and a discharge circuit configured to provide a first discharge path for discharging the power supply voltage based on an enable signal which is generated depending on the overcharge recognition signal.

The overcharge recognition circuit may include a comparator configured to output an overcharge recognition signal by comparing a voltage level of the reference voltage and a voltage level of the feedback voltage.

When the voltage level of the feedback voltage is lower than the voltage level of the reference voltage, the circuit may be determined as an overcharge state, and the comparator may output an overcharge recognition signal.

The display device may further include an inductor connected to the first node, a discharge speed of the power voltage may be controlled by the operation of the discharge circuit when a panel is within a predetermined range, and may be controlled by adjusting charging and discharging times of the inductor when the panel load is outside the predetermined range.

A plurality of intermediate target voltage levels may be set between a current voltage level of the power supply voltage and a target voltage level of the power supply voltage, and discharging the power supply voltage may be repeatedly performed at a plurality of times depending on the intermediate target voltage levels.

The intermediate target voltage levels may be set by using an upper level code and a lower level code.

The display device may further include: a third transistor controlled by a third control signal, wherein the third transistor is to connect the second node to a ground terminal; and a resistor configured to provide a second discharge path through the third transistor based on the enable signal.

An example embodiment provides an operating method of a display device, including: receiving a value of a panel load; determining the value of the panel load; charging an inductor of a power management integrated circuit (PMIC) and adjusting charging and discharging times of the inductor of the PMIC by controlling a discharge rate of a power supply voltage when the value of the panel load exceeds a threshold value; and charging the inductor of the PMIC and adjusting charging and discharging times of the inductor of the PMIC by controlling the discharge rate of the power supply voltage through a discharge circuit of the PMIC when the value of the panel load is less than or equal to the threshold value.

The discharge circuit may provide a first discharge path for discharging the power supply voltage based on an enable signal generated depending on an overcharge recognition signal.

The discharging circuit may be enabled by an enable signal which is generated by performing a logic operation on the overcharge recognition signal and an ELVSS high signal.

The controlling of the discharge rate of the power voltage through the discharge circuit may further include a step of controlling the discharge rate of the power supply voltage through a resistor of the PMIC.

The controlling of the discharge rate of the power voltage through the discharge circuit may include: setting a plurality of intermediate target voltage levels set between a current voltage level of the power supply voltage and a target voltage level of the power supply voltage; and repeating discharging of the power supply voltage depending on the intermediate target voltage levels.

According to some example embodiments, when the power supply voltage ELVSS is discharged, it is possible to not only improve the phenomenon that the luminance change of the screen is visually recognized due to the voltage change but also realize discharge control of the power supply voltage ELVSS that is suitable for various frequencies such as 60 Hz and 120 Hz.

BRIEF DESCRIPTION OF THE DRAWINGS

FIG. 8, FIG. 9, and to FIG. 10 illustrate views for describing an example of a specification that can be set in a display device according to example embodiments.

DETAILED DESCRIPTION

Figure 1:
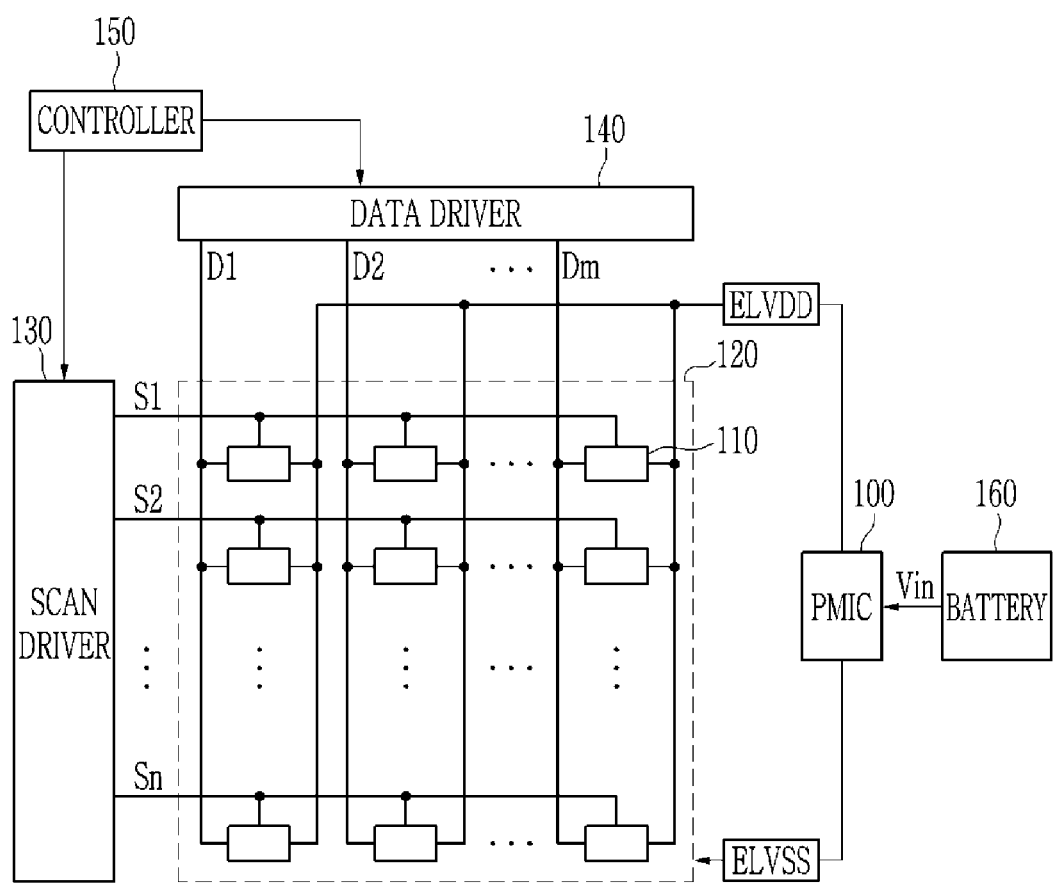
FIG. 1 illustrates a block diagram for describing a display device according to an example embodiment.

The present disclosure will be described more fully hereinafter with reference to the accompanying drawings, in which example embodiments of the disclosure are shown. As those skilled in the art would realize, the described embodiments may be modified in various different ways, all without departing from the spirit or scope of the present disclosure.

To clearly describe the present disclosure, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present disclosure is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

FIG. 1 illustrates a block diagram for describing a display device according to an example embodiment.

Referring to FIG. 1, the display device according to the example embodiment may be an organic light emitting display OLED, but the scope of the present disclosure is not limited thereto, and in the present example embodiment, the display device may include a power management integrated circuit 100, a pixel unit 120, a scan driver 130, a data driver 140, and a controller 150.

The pixel unit 120 may include one or more pixels 110 connected to one or more scan lines S1 to Sn and one or more data lines D1 to Dm.

Each of the pixels 110 includes a pixel circuit (not illustrated) connected to the organic light emitting diode OLED, a data line Dm, and a scan line Sn to control the organic light emitting diode OLED, and an anode of the organic light emitting diode OLED is connected to the pixel circuit, while the cathode is connected to a power supply voltage ELVSS. Such an organic light emitting diode OLED generates light of a predetermined luminance in response to a current supplied from a pixel circuit. The pixel circuit includes elements such as transistors and capacitors for controlling an amount of current supplied to the organic light emitting diode OLED in response to a data signal supplied to the data line Dm when a scan signal is supplied to the scan line Sn.

The scan driver 130 may supply a scan signal to each pixel 110 through one or more scan lines S1 to Sn. The data driver 140 may supply a data signal to each pixel 110 through one or more data lines D1 to Dm.

The power management integrated circuit 100 may supply power supply voltages ELVDD and ELVSS to each pixel 110. Specifically, the power management integrated circuit 100 receives an input voltage Vin, converts the received input voltage Vin, and generates power supply voltages ELVDD and ELVSS supplied to each pixel 110. The power supply voltage ELVDD may be a positive voltage, the power supply voltage ELVSS may be a negative voltage, and the input voltage Vin may be supplied from a battery 160 charged with predetermined power.

Each of the pixels 110 that has been received the power supply voltages ELVDD and ELVSS from the power management integrated circuit 100 may generate light corresponding to the data signal by a current flowing from the power supply voltage ELVDD to the power supply voltage ELVSS via the organic light emitting diode.

The controller 150 may control the scan driver 130 and the data driver 140. The scan driver 130 may generate a scan signal under the control of the controller 150, and may supply the generated scan signal to one or more scan lines S1 to Sn. The data driver 140 may generate a data signal under the control of the controller 50, and may supply the generated data signal to one or more data lines D1 to Dm. When the scan signal is sequentially supplied to the one or more scan lines S1 to Sn, the pixels 110 may be sequentially selected for each line, and the selected pixel 110 may receive a data signal transferred from the one or more data lines D1 to Dm.

Hereinafter, example embodiments will be described by focusing on the power management integrated circuit 100 and the power supply voltage ELVSS supplied to the pixels 110 from the power management integrated circuit 100.

Figure 2:
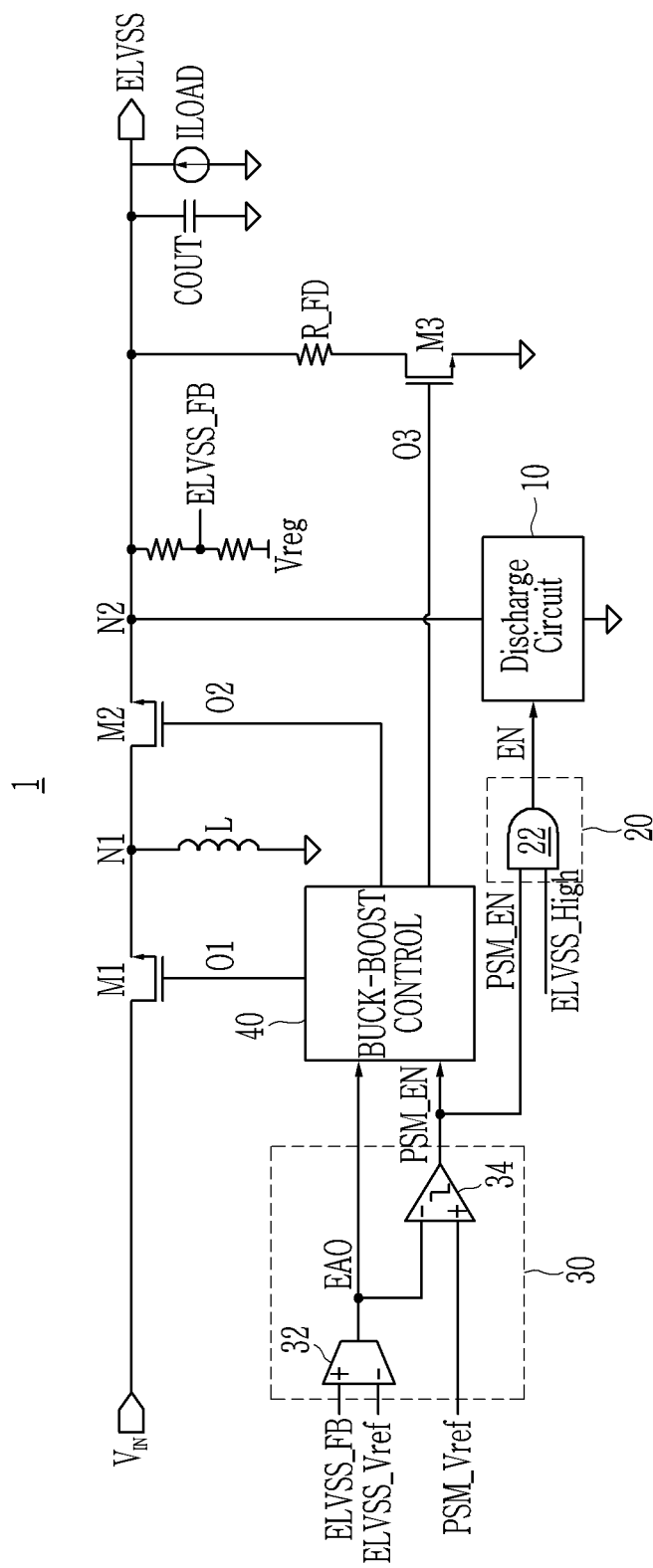
FIG. 2 is a circuit diagram for describing a power management integrated circuit (PMIC) of a display device according to an example embodiment.

FIG. 2 illustrates a circuit diagram showing a power management integrated circuit of a display device according to an example embodiment. The power management integrated circuit 1 of the display device according to the example embodiment may correspond to the power management integrated circuit 100 of FIG. 1.

Referring to FIG. 2, the power management circuit 1 includes transistors M1, M2, and M3, an inductor L, a discharge circuit 10, an enable signal generation circuit 20, an overcharge recognition circuit 30, and a control circuit 40.

The transistor M1 may be disposed between an input terminal to which an input voltage Vin is applied and the node N1. That is, a first electrode of the transistor M1 may be connected to the input terminal to which the input voltage Vin is applied, and a second electrode of the transistor M1 may be connected to the node N1. It may be controlled by a control signal O1 supplied from the control circuit 40 to connect the input terminal to which the input voltage Vin is applied and the node N1.

The transistor M2 may be disposed between the node N1 and the node N2 from which the power supply voltage ELVSS is outputted. That is, a first electrode of the transistor M2 may be connected to the node N1, and a second electrode of the transistor M2 may be connected to the node N2 from which the power supply voltage ELVSS is outputted. It may be controlled by a control signal O2 supplied from the control circuit 40 to connect the input terminal to which the power voltage Vin is applied and the node N1.

The transistor M3 may be disposed between the node N2 and a ground terminal. That is, a first electrode of the transistor M3 may be connected to the node N2 through a resistor R_FD, and a second electrode of the transistor M3 may be connected to the ground terminal. It may be controlled by a control signal O3 supplied from the control circuit 40 to connect the node N2 and the ground terminal.

A first terminal of the inductor L may be connected to the node N1, and a second terminal of the inductor L may be connected to the ground terminal. When the transistor M1 is turned on and the transistor M2 is turned off by the control signals O1 and O2, a voltage applied to the node N1 becomes the input voltage Vin, and the inductor L charges a predetermined energy. In contrast, when the transistor M1 is turned off and the transistor M2 is turned on by the control signals O1 and O2, energy charged in the inductor L may be transferred to the output terminal through which the power voltage ELVSS is outputted.

The control circuit 40 may compare the input voltage Vin and the power supply voltage ELVDD to selectively choose one of a boost mode, a buck mode, or a buck-boost mode, and may control turn-on and turn-off of the transistors M1, M2, and M3 depending on the selected mode. That is, the control circuit 40 may control turn-on and turn-off states of the transistors M1, M2, and M3 by supplying the control signals O1, O2, and O3 having a pulse width which is adjusted depending on each mode to gate electrodes of the transistors M1, M2, and M3.

The discharge circuit 10 may provide a discharge path for discharging the power supply voltage ELVSS. That is, the discharge circuit 10 may provide a discharge path through which the power voltage ELVSS may be discharged through the node N2, the discharge circuit 10, and the ground terminal. The discharging circuit 10 may be implemented to operate by being activated or enabled when necessary depending on an operating condition of the display device. For example, the discharge circuit 10 may provide a discharge path for discharging the power supply voltage ELVSS based on an enable signal EN. Herein, the enable signal EN may be generated depending on an overcharge recognition signal PSM_EN.

The discharge circuit 10 may be implemented by using any electronic device capable of providing the aforementioned discharge path. For example, the discharge circuit 10 may be implemented as a circuit of any configuration that includes an arbitrary electronic device such as a resistor, a transistor, and a current source, and has a function of activating an operation when receiving the enable signal EN.

The enable signal generation circuit 20 may supply the enable signal EN to the discharge circuit 10. That is, the enable signal generation circuit 20 may generate the enable signal EN by performing a logic operation on the overcharge recognition signal PSM_EN and an ELVSS high signal ELVSS_High, and may supply the generated enable signal EN to the discharge circuit 10. Herein, the ELVSS high signal ELVSS_High may be a signal supplied from a driver IC of the display device to the power management integrated circuit 1, and the logical operation may include an AND logical operation, but the scope of the present disclosure is not limited thereto. When the logical operation is the AND logical operation, i.e., both the overcharge recognition signal PSM_EN and the ELVSS high signal ELVSS_High are logic high, the enable signal EN may be supplied to the discharge circuit 10 so as to operate the discharge circuit 10.

An internal configuration of the enable signal generation circuit 20 illustrated in FIG. 2 is only an example, but may vary depending on a specific implementation purpose of the present disclosure.

The overcharge recognition circuit 30 may supply the overcharge recognition signal PSM_EN to the enable signal generation circuit 20. That is, the overcharge recognition circuit 30 may receive a reference voltage ELVSS_Vref, a feedback voltage ELVSS_FB, and a reference voltage PSM_Vref, may determine whether it is overcharged or not and output an overcharge recognition signal PSM_EN, and may supply the output overcharge recognition signal PSM_EN to the enable signal generation circuit 20. That is, when the overcharge recognition circuit 30 recognizes that the overcharge has occurred, the discharge circuit 10 may be operated through the enable signal generation circuit 20 to promote discharge of the power supply voltage ELVSS.

In the present example embodiment, the overcharge recognition circuit 30 may include an error amplifier 32 and a comparator 34. The error amplifier 32 may amplify a difference between the reference voltage ELVSS_Vref and the feedback voltage ELVSS_FB to output an error amplification output signal EAO. For example, when the voltage level of the feedback voltage ELVSS_FB is higher than a voltage level of the reference voltage ELVSS_Vref, a voltage level of the error amplification output signal EAO may fall because it is determined as an overcharge state (e.g., a state in which a target voltage is −4 V but it is overcharged to −4.01 V). Conversely, when the voltage level of the feedback voltage ELVSS_FB is lower than the voltage level of the reference voltage ELVSS_Vref, it is determined that the charge is insufficient (e.g., the target voltage is −4 V, but the charge is insufficient at −3.99 V), so that the voltage level of the error amplification output signal EAO may increase.

In the case of an overcharge state, the comparator 34 may compare the voltage level of the error amplification output signal EAO with the voltage level of the reference voltage PSM_Vref to output the overcharge recognition signal PSM_EN. That is, when the voltage level of the error amplification output signal EAO is lower than the voltage level of the reference voltage PSM_Vref, the comparator 34 may output the overcharge recognition signal PSM_EN.

As described above, if necessary depending on an operating situation of the display device, as the discharge circuit 10 configured to be activated or enabled to operate is adopted in the power management integrated circuit 1, a discharge rate of the power supply voltage ELVSS may be adjusted and varied accordingly.

Figure 3:
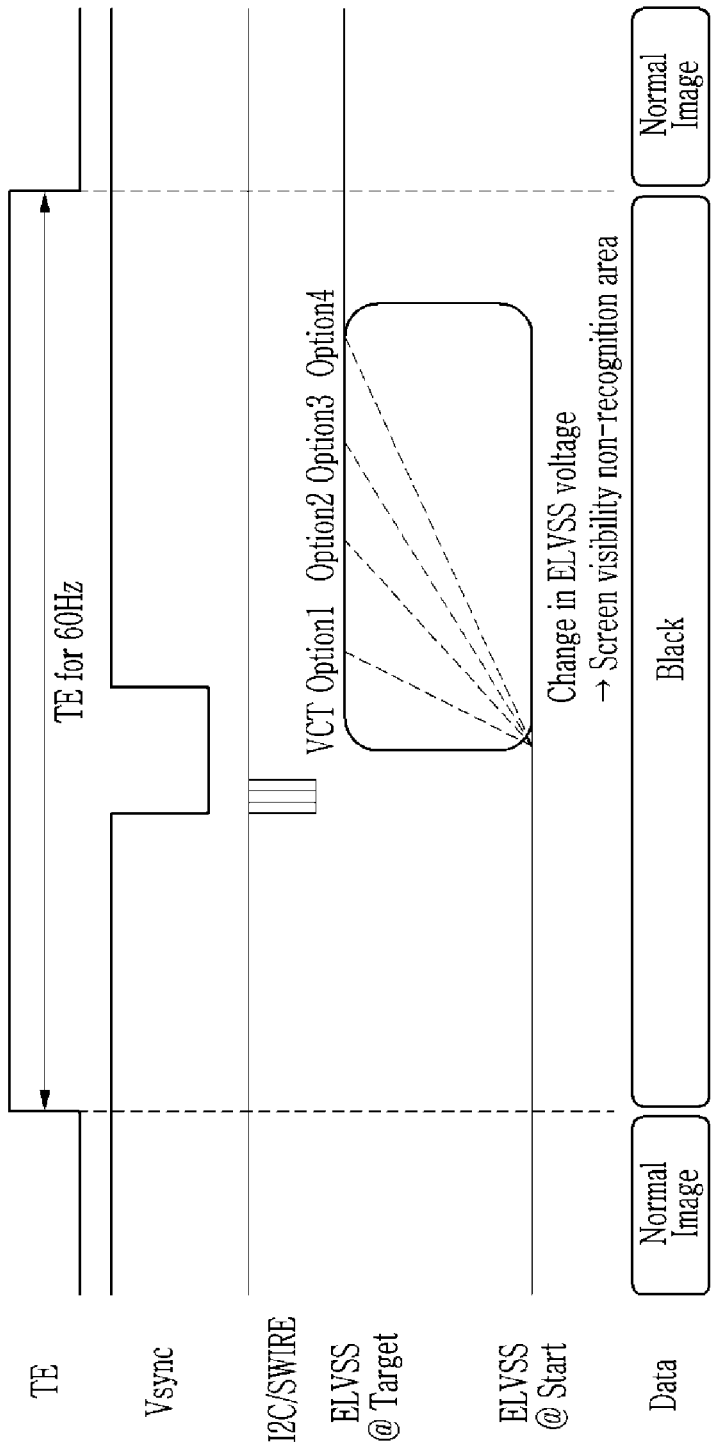
FIG. 3 illustrates a timing diagram for describing a change in a power supply voltage ELVSS in a display device according to an example embodiment.

FIG. 3 illustrates a timing diagram for describing a change in a power supply voltage ELVSS in a display device according to an example embodiment.

Referring to FIG. 3, a TE (tearing effect) signal may operate as a signal for setting a data voltage. When a voltage change of the power supply voltage ELVSS is not completed during a period during which the TE signal is logic high, a change in luminance is recognized by a user of a display panel.

In the present example embodiment, when the display device is driven at 60 Hz, the power management integrated circuit 1 of FIG. 2 may provide a plurality of options, e.g., four voltage change time (VCT) options. That is, the power management integrated circuit 1 may support a plurality of options capable of discharging the power supply voltage ELVSS at different rates during the period during which the TE signal is logic high, by using the discharge circuit 10. In addition, in the power management integrated circuit 1, the larger or smaller the panel load, the faster or slower the power supply voltage ELVSS is not discharged, but the power supply voltage ELVSS may be discharged at a constant rate regardless of a change of a panel load without being affected by the panel load.

In FIG. 3, during the period during which the TE signal is logic high, after a Vsync signal is changed to logic low and the I2C/SWIRE signal is applied, the power management integrated circuit 1 shows four options Option 1, Option 2, Option 3, and Option 4 for reaching the starting power supply voltage ELVSS to the target power supply voltage ELVSS. Among them, Option 1 provides discharge of a fastest power supply voltage ELVSS, and Option 4 provides discharge of a slowest supply voltage ELVSS. However, even in the case of Option 4, it can be seen that discharging of the power supply voltage ELVSS can be completed before a period during which the TE signal is still logic high ends.

Figure 4:
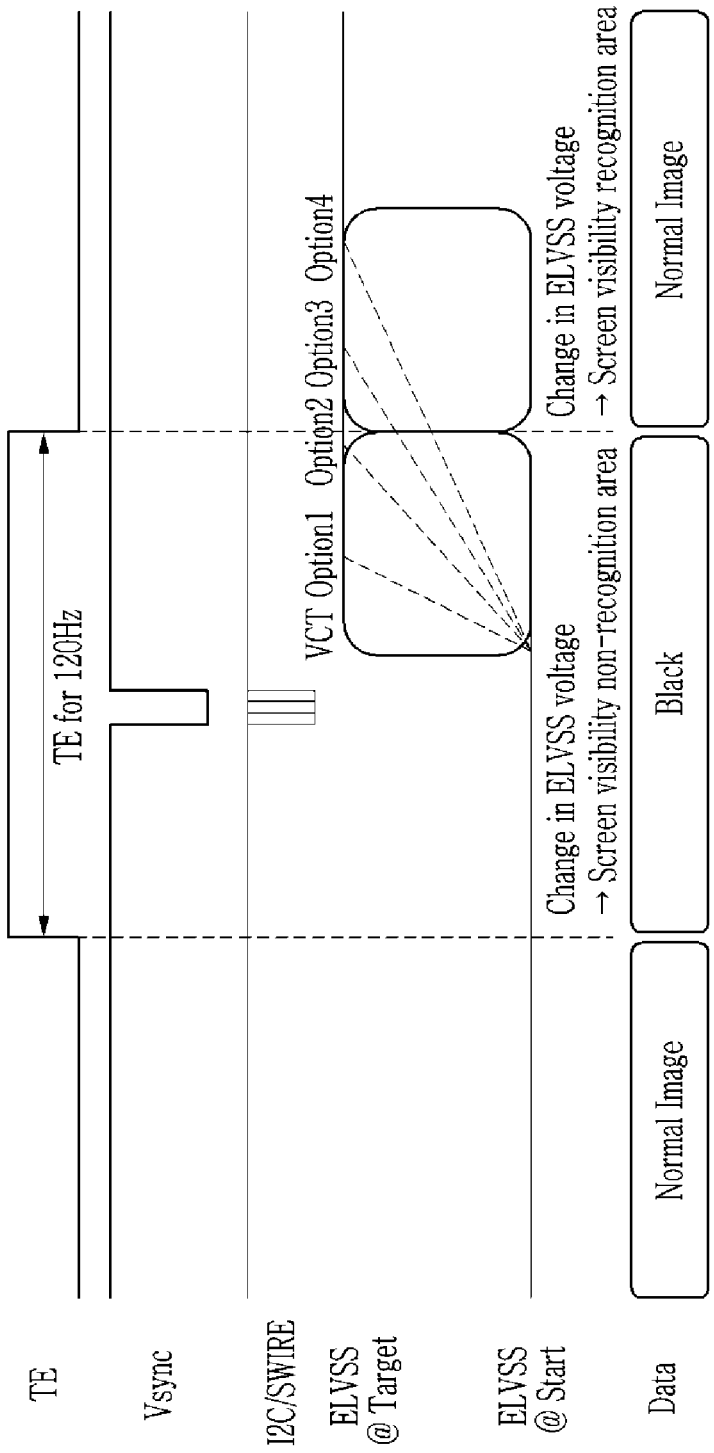
FIG. 4 illustrates a timing diagram for describing a change in a power supply voltage ELVSS in a display device according to an example embodiment.

FIG. 4 illustrates a timing diagram for describing a change in a power supply voltage ELVSS in a display device according to an example embodiment.

Referring to FIG. 4, in the present example embodiment, the display device is driven at 120 Hz. In this case, the power management integrated circuit 1 of FIG. 2 may provide a plurality of options Option 1, Option 2, Option 3, and Option 4. This is because when a driving rate of the display device increases from 60 Hz to 120 Hz, a length of the period during which the TE signal is logic high becomes shorter. Accordingly, Option 1 provides fastest discharge of the power supply voltage ELVSS, Options 1 and 2 correspond to areas where a user does not recognize changes in luminance, Options 3 and 4 leave the discharge of the power supply voltage ELVSS out of a logic high period of the TE signal, and Options 3 and 4 correspond to areas where a user recognizes changes in luminance.

Figure 5:
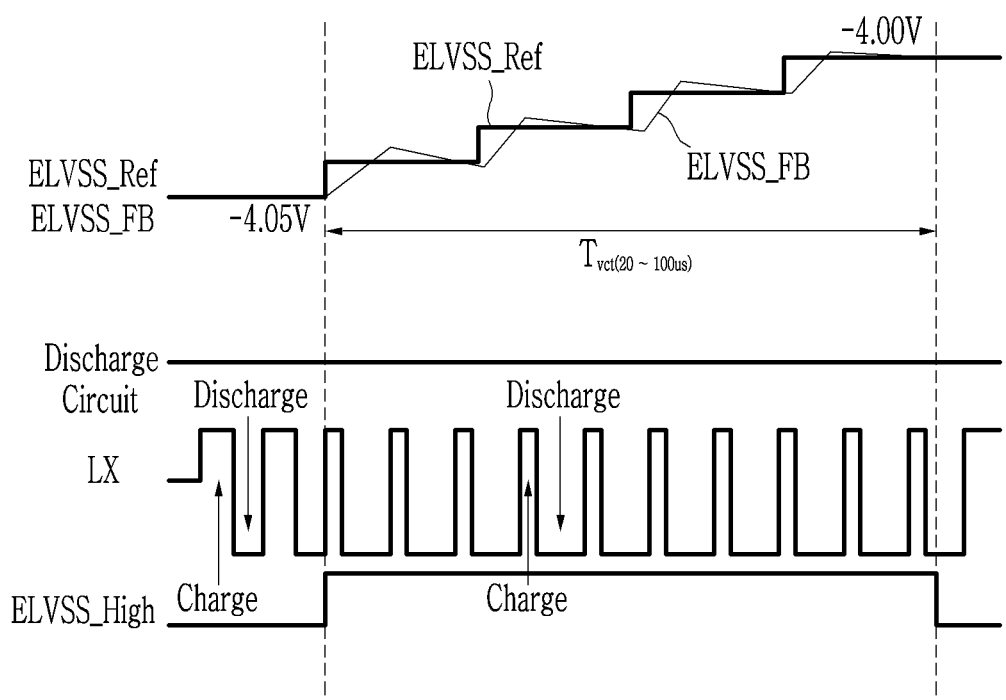
FIG. 5 illustrates a timing diagram showing an implementation example for varying a power supply voltage ELVSS in a display device according to an example embodiment.

FIG. 5 illustrates a timing diagram showing an implementation example for varying a power supply voltage ELVSS in a display device according to an example embodiment.

Referring to FIG. 5, a voltage level of the feedback voltage ELVSS_FB which is located below a voltage level of the reference voltage ELVSS_Vref may correspond to a case of being overcharged, while the voltage level of the feedback voltage ELVSS_FB which is located above a voltage level of the reference voltage ELVSS_Vref may correspond to a case of insufficient charging.

In this case, a discharge rate of the power supply voltage ELVSS may be controlled by adjusting charging and discharging times of the inductor L, as a case where the panel load is out of a predetermined range. For example, in a load having a discontinuous conduction mode (DCM) operation or higher, the discharge rate of the power supply voltage ELVSS may be varied by adjusting the charging and discharging times of the inductor L. In the present example embodiment, when the panel load is 20 mA or more where the panel load is out of a predetermined range, the power voltage ELVSS may be varied by adjusting the charging and discharging times of the inductor L.

Figure 6:
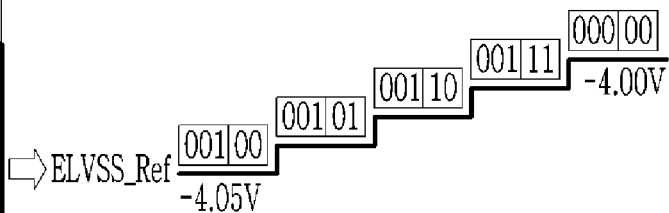
FIG. 6 illustrates a timing diagram showing an implementation example for varying a power supply voltage ELVSS in a display device according to an example embodiment.

FIG. 6 illustrates a timing diagram showing an implementation example for varying a power supply voltage ELVSS in a display device according to an example embodiment.

Referring to FIG. 6, in the display device according to the present example embodiment, to vary the power supply voltage ELVSS, a plurality of intermediate target voltage levels are set between a current voltage level of the power supply voltage ELVSS and a target voltage level of the power supply voltage ELVSS, and discharge of the power supply voltage ELVSS may be repeatedly performed a plurality of times depending on the intermediate target voltage levels.

For example, in the case where a current voltage level is −4.05 V and a target voltage level is −4.00 V, that is, when a command applied by the driver IC to the power management integrated circuit 1 instructs to vary the power supply voltage ELVSS in units of 50 mV, when it is changed from −4.05 V to −4.00 V at once, overshoot or undershoot is likely to occur. In this case, the display device according to the example embodiment may repeatedly perform discharge to change it by 12.5 mV once at a plurality of times by setting, e.g., three intermediate target voltage levels between the current voltage level of the power supply voltage ELVSS and the target voltage level of the power supply voltage ELVSS.

To this end, the intermediate target voltage levels may be set by using an upper level code and a lower level code. In FIG. 6, the upper level code is displayed as "ELVSS_Ref Digital Code", the lower level code is displayed as "Sub DAC", and the intermediate target voltage levels are indicated as "ELVSS value" respectively.

For example, when the current voltage level is −4.05 V and the target voltage level is −4.00 V, the upper level code is "001" and the lower level code is "00," and after the discharge operation of as much as 12.5 mV is performed, the upper level code is changed to "001" and the lower level code is changed to "01."

Thereafter, the discharge operation of as much as 12.5 mV is performed, the upper level code is changed to "001" and the lower level code is changed to "10," the discharge operation of as much as 12.5 mV is performed, the upper level code is changed to "001" and the lower level code is changed to "11," the discharge operation of as much as 12.5 mV is performed, and a target voltage level corresponding to "000" for the upper level code and "00" for the lower level code may be reached.

Specific values of the high-level code and the low-level code shown in the present example embodiment do not limit the scope of the present disclosure, and may be implemented differently depending on a specific implementation purpose of the display device.

Figure 7:
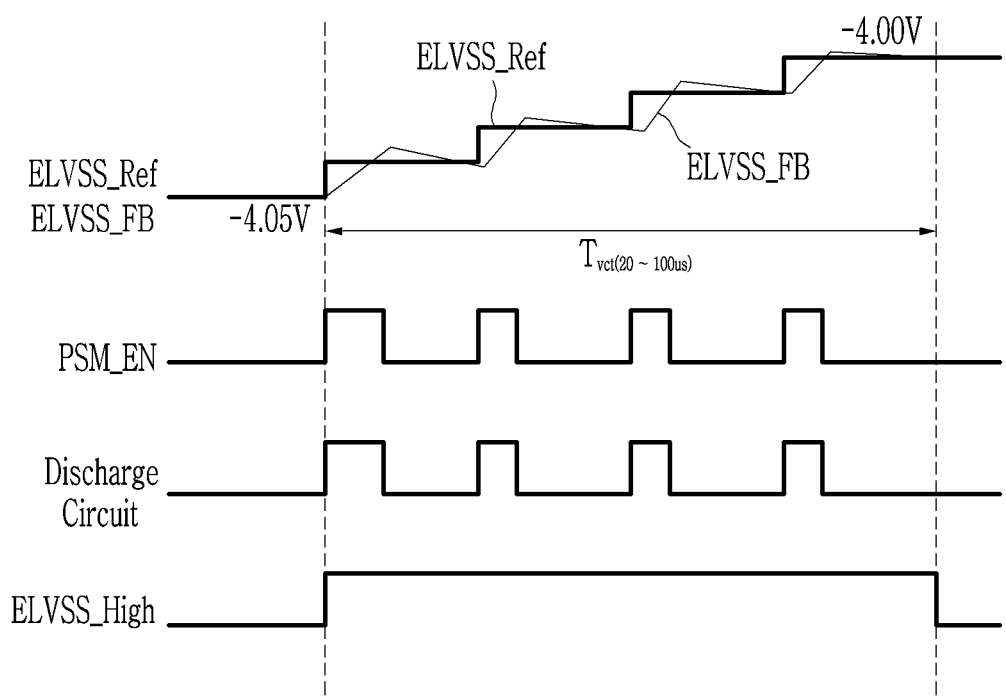
FIG. 7 illustrates a timing diagram showing an implementation example for varying a power supply voltage ELVSS in a display device according to an example embodiment.

FIG. 7 illustrates a timing diagram showing an implementation example for varying a power supply voltage ELVSS in a display device according to an example embodiment.

Referring to FIG. 7, a voltage level of the feedback voltage ELVSS_FB which is located below a voltage level of the reference voltage ELVSS_Vref may correspond to a case of being overcharged, while the voltage level of the feedback voltage ELVSS_FB which is located above a voltage level of the reference voltage ELVSS_Vref may correspond to a case of insufficient charging.

In this case, the discharge rate of the power supply voltage ELVSS may be controlled by the operation of the discharge circuit 10 when the panel load falls within a predetermined range, and the discharge rate of the power supply voltage ELVSS may be varied by operating the discharge circuit 10 during a period during which the overcharge recognition signal (PSM_EN) is logic high.

In the present example embodiment, when the panel load is in range of 0 mA to 20 mA or less as an example of when the panel load falls within a predetermined range, the power supply voltage ELVSS may be varied by operating the discharge circuit 10.

Figure 9:
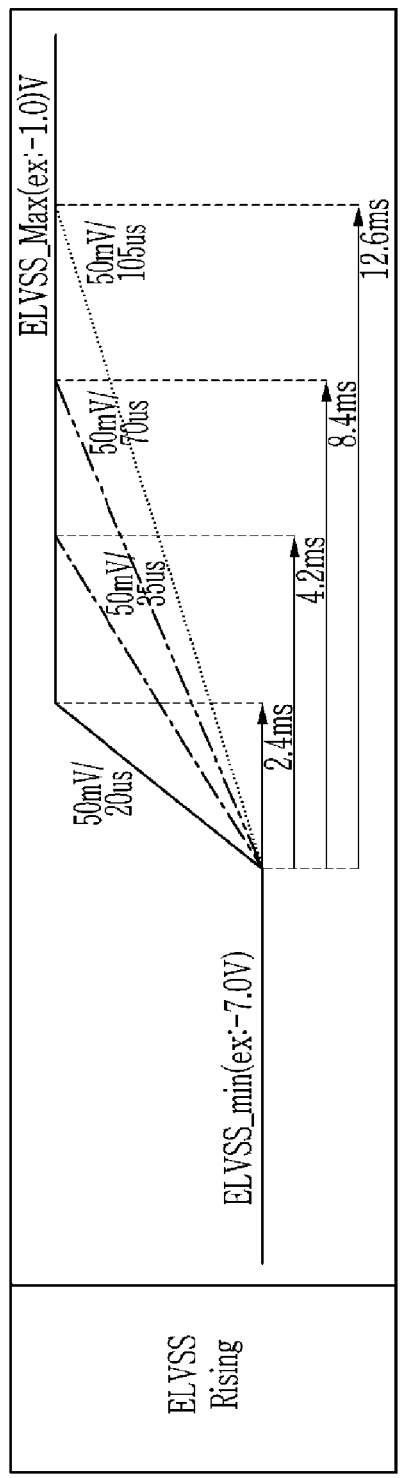
Figure 10:
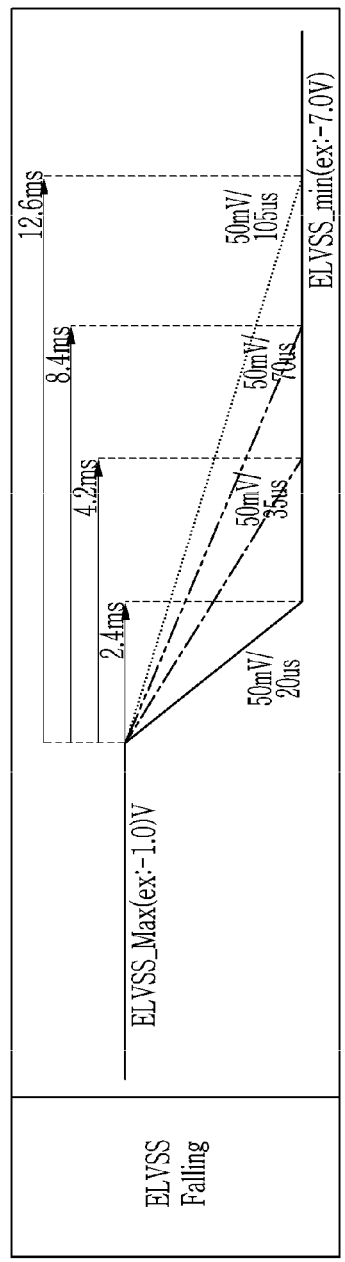

FIGS. 8, 9, and 10 illustrate views for describing an example of a specification that can be set in a display device according to example embodiments.

As illustrated in FIGS. 8, 9, and 10, a register for storing values for a VCT rising time and a VCT falling time may be defined. For example, in the case where "VCT_Falling[3:2]" has a value of "01," a time when it is set as 50 mV/20 us to change the voltage is 4.2 ms, and in the case where "VCT_Falling[3:2]" has a value of "10", it is set to 50 mV/70 us, so a voltage fluctuation period may take 8.4 ms.

However, contents illustrated in FIGS. 8, 9, and 10 are only related to an example embodiment, and a definition of the register or specific values stored in the register may vary depending on the specific implementation purpose of the present disclosure.

Figure 11:
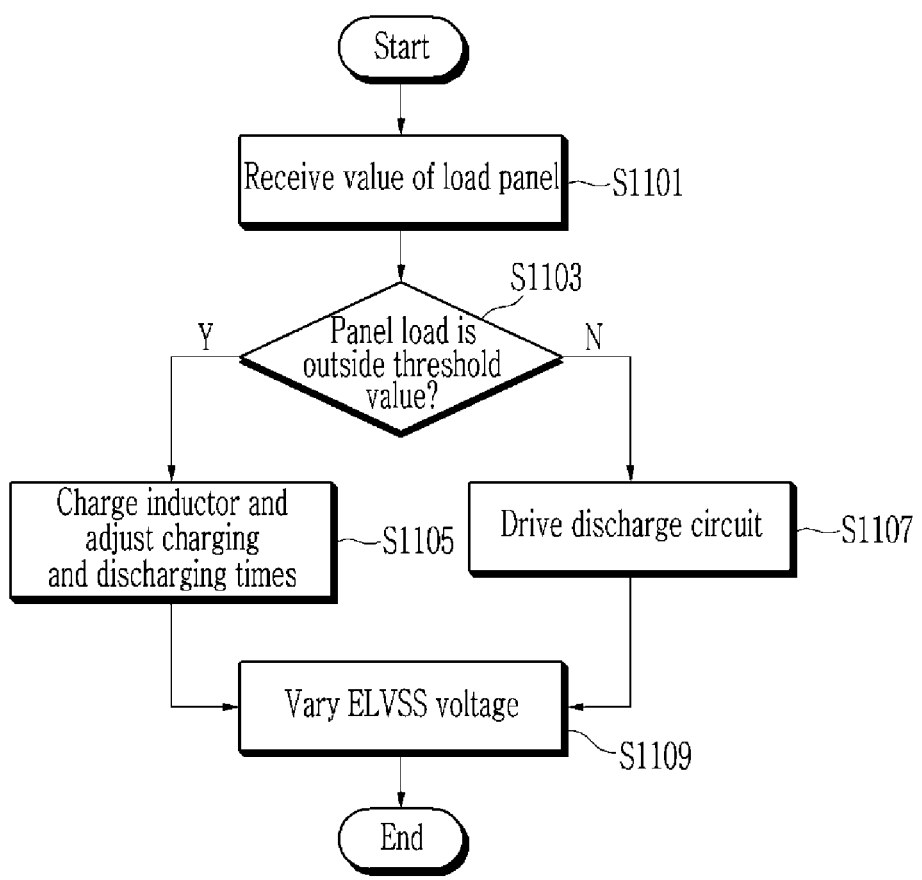
FIG. 11 illustrates a flowchart showing an operating method of a display device according to an example embodiment.

FIG. 11 illustrates a flowchart showing an operating method of a display device according to an example embodiment.

Referring to FIG. 11, the operating method of the display device according to the example embodiment may include a step of receiving a value of a panel load (S1101).

When the value of the panel load exceeds a threshold value (S1103, 'Y'), the operating method of the display device may charge an inductor L of the PMIC 100 and adjust charging and discharging times of the inductor L of the PMIC 100 (S1105) by controlling a discharge rate of a power supply voltage.

When the panel load value is less than the threshold value (S1103, 'N'), the operation method of the display device may drive the discharge circuit 10 of the PMIC 100 (S1107) by controlling a discharge rate of the power supply voltage through a discharge circuit of the PMIC.

Lastly, after the both cases, the operating method of the display device may include a step of varying the power supply voltage ELVSS (S1109) by controlling the discharge rate of the power supply voltage ELVSS through step S1105 or step S1107.

The discharge circuit 10 may provide a discharge path through which the power voltage ELVSS may be discharged through the node N2, the discharge circuit 10, and the ground terminal based on the enable signal EN generated depending on the overcharge recognition signals PSM_EN and COMP_EN in order to discharge the power supply voltage ELVSS. In addition, the discharge circuit 10 may be enabled by the enable signal EN generated by performing a logic operation on the overcharge recognition signals PSM_EN and COMP_EN and the ELVSS high signal ELVSS_High.

Meanwhile, the controlling of the discharge rate of the power supply voltage ELVSS through the discharge circuit 10 may further include a step of controlling the discharge rate of the power supply voltage ELVSS through a resistor R_FD of the PMIC 100.

On the other hand, the controlling of the discharge rate of the power supply voltage ELVSS through the discharge circuit 10 may include a step of setting the intermediate target voltage levels between the current voltage level of the power supply voltage ELVSS and the target voltage level of the power supply voltage ELVSS, and a step of repeating the discharge of the power supply voltage ELVSS at a plurality of times depending on the intermediate target voltage levels.

Figure 12:
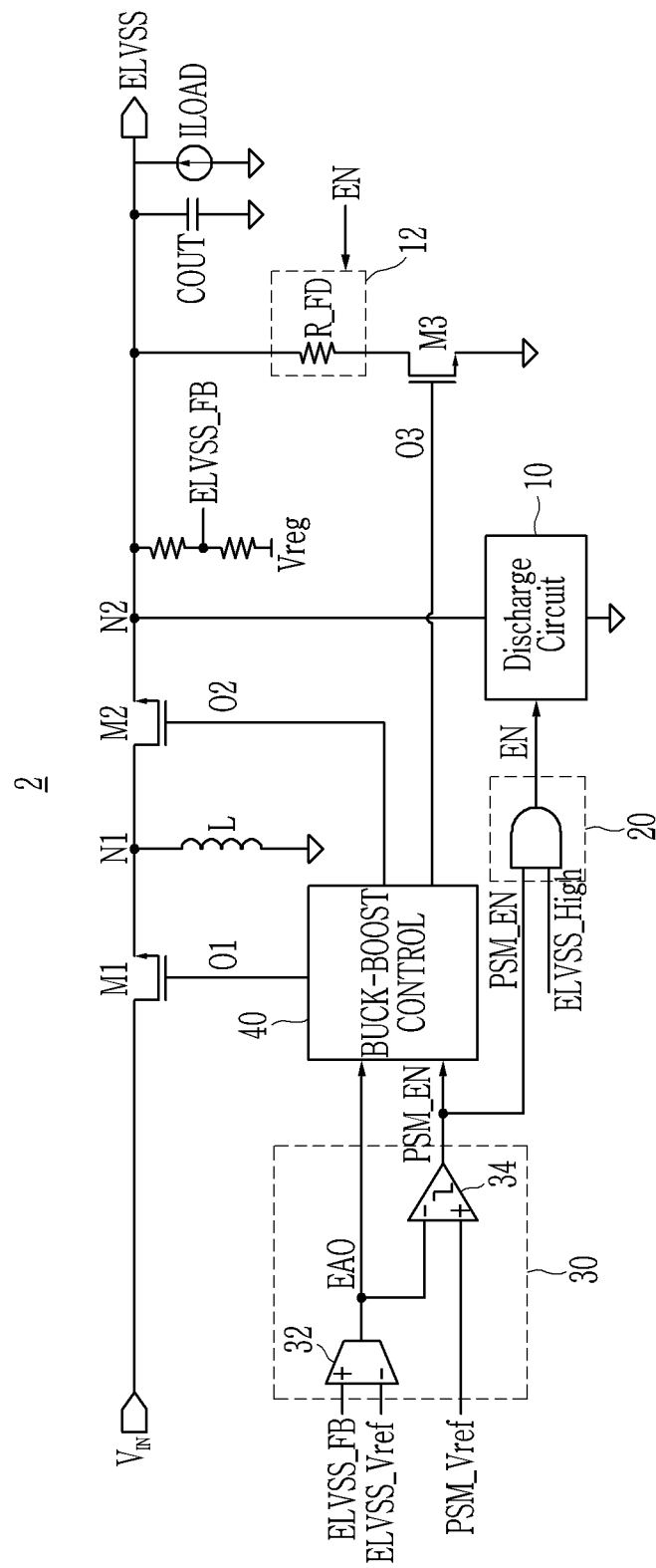
FIG. 12 illustrates a circuit diagram showing a power management integrated circuit of a display device according to an example embodiment.

FIG. 12 illustrates a circuit diagram showing a power management integrated circuit of a display device according to an example embodiment.

Referring to FIG. 12, the power management integrated circuit 2 of the display device according to the example embodiment may further comprise an element 12 which includes a resistor R_FD providing a discharge path through the transistor M3 based on the enable signal EN.

The discharge rate by the discharge circuit 10 may be limited by an internal clock rate, and an additional second discharge path may be required in addition to the first discharge path through which the power voltage ELVSS may be discharged through the node N2, the discharge circuit 10, and the ground terminal, in order to accelerate VCT discharge without increasing the clock rate. To that end, the second discharge path through which the power voltage ELVSS may be further discharged may be formed through the node N2, the resistor R_FD, the transistor M3, and the ground terminal by using the resistor R_FD that is activated or enabled by the enable signal EN, and both the first discharge path and the second discharge path may be simultaneously activated or enabled by the enable signal EN.

Figure 13:
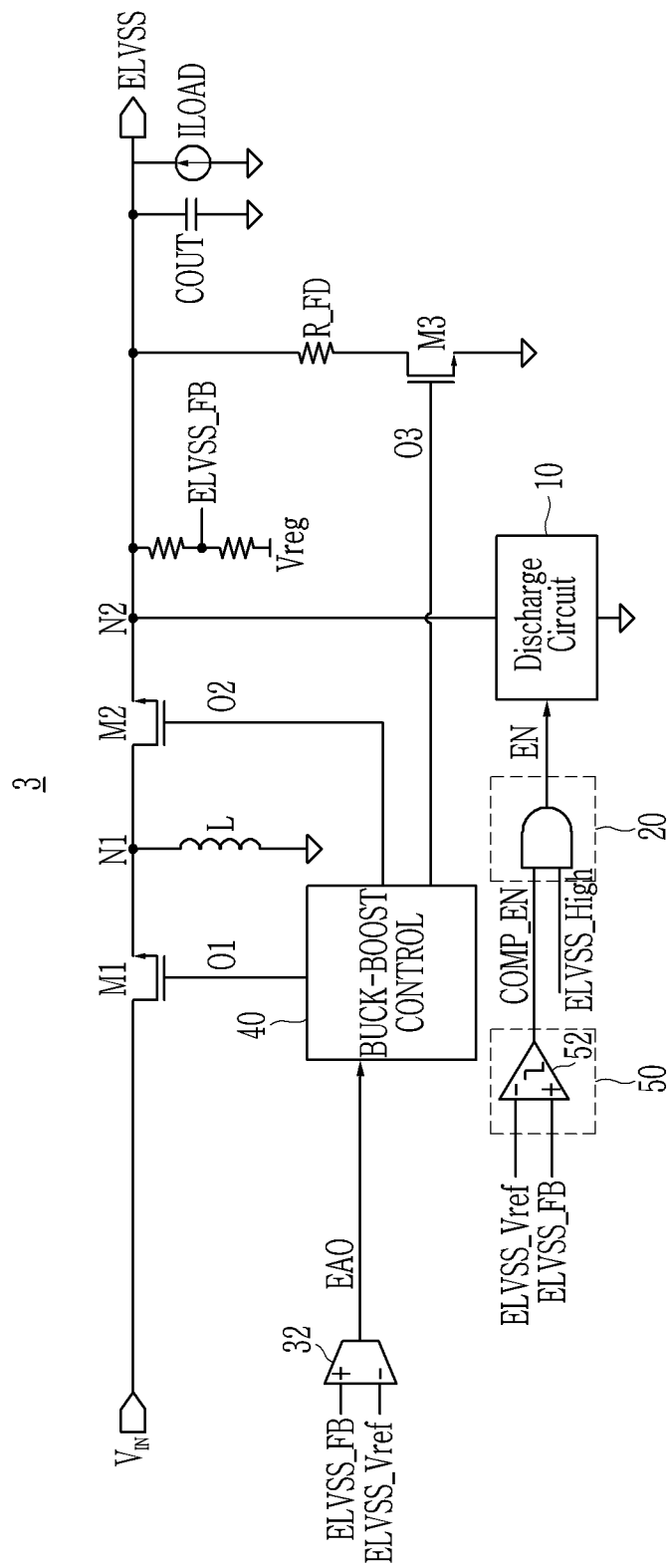
FIG. 13 illustrates a circuit diagram showing a power management integrated circuit of a display device according to an example embodiment.
Figure 14:
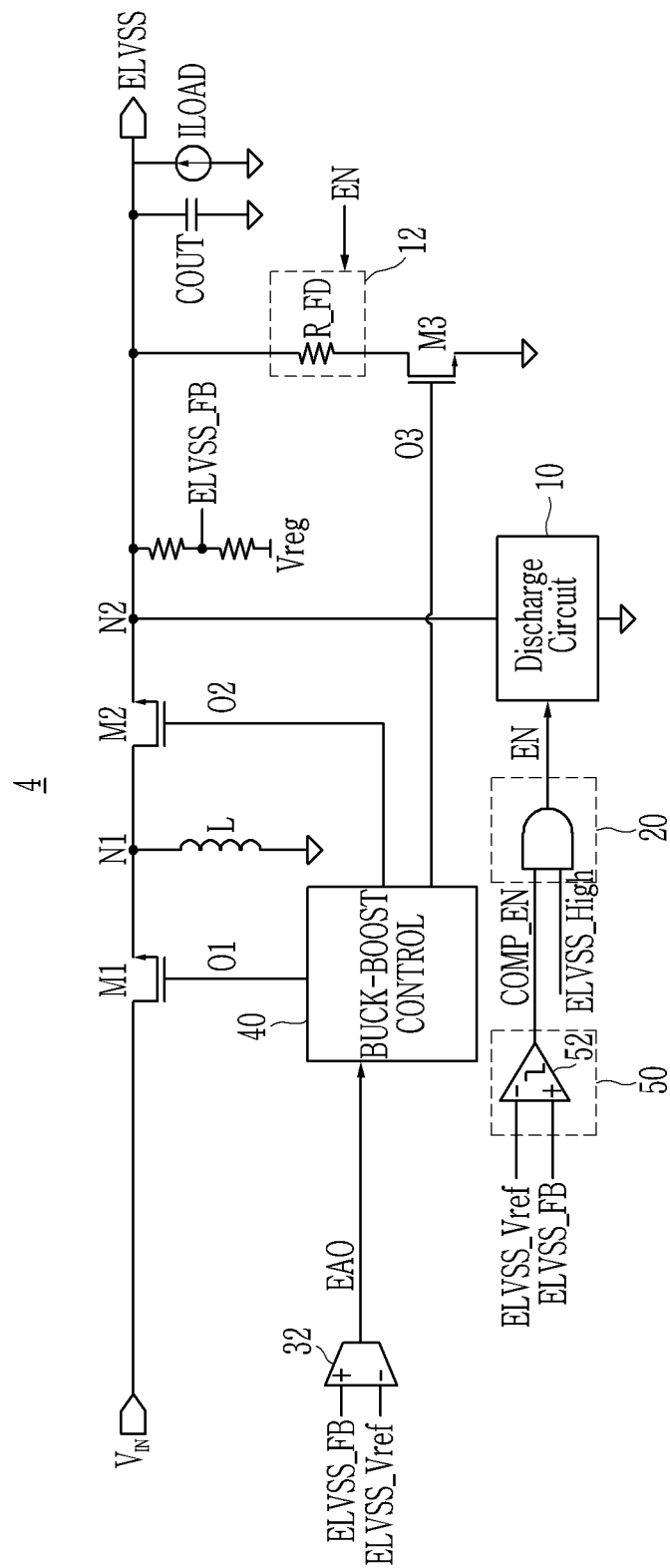
FIG. 14 illustrates a circuit diagram showing a power management integrated circuit of a display device according to an example embodiment.

FIG. 13 illustrates a circuit diagram showing a power management integrated circuit of a display device according to an example embodiment, and FIG. 14 illustrates a circuit diagram showing a power management integrated circuit of a display device according to an example embodiment.

The embodiment shown in FIG. 2 and FIG. 12, the control circuit 40 is implemented in a pulse width modulation (PWM) method, which is able to use the overcharge recognition signal PSM_EN, while the embodiment shown in FIG. 13 and FIG. 14, the control circuit 40 is implemented in a pulse frequency modulation (PWM) method, which is not able to the overcharge recognition signal PSM_EN.

In this case, the overcharge recognition circuit 50 may provide the overcharge recognition signal COMP_EN to the enable signal generation circuit 20 in a power management integrated circuit 3 of the display device according to the example embodiment. That is, the overcharge recognition circuit 50 may receive the reference voltage ELVSS_Vref and the feedback voltage ELVSS_FB may determine whether overcharge occurs or not and output an overcharge recognition signal COMP_EN, and may supply the output overcharge recognition signal COMP_EN to the enable signal generation circuit 20. Then, the discharge circuit 10 may provide a discharge path for discharging the power voltage ELVSS based on the enable signal EN generated depending on the overcharge recognition signal COMP_EN.

In the present example embodiment, the overcharge recognition circuit 50 may include a comparator 52. The comparator 50 may compare a voltage level of the reference voltage ELVSS_Vref and a voltage level of the feedback voltage ELVSS_FB to output the overcharge recognition signal COMP_EN. For example, when the voltage level of the feedback voltage ELVSS_FB is lower than the voltage level of the reference voltage ELVSS_Vref, it may be determined as an overcharge state, and the comparator 52 may output the overcharge recognition signal COMP_EN.

As described above, if necessary depending on an operating situation of the display device, as the discharge circuit 10 configured to be activated or enabled to operate is adopted in the power management integrated circuit 3, a discharge rate of the power supply voltage ELVSS may be adjusted and varied.

In the meantime, the power management integrated circuit 4 of the display device according to the example embodiment may further include an element 12 including a resistor R_FD providing a discharge path through the transistor M3 based on the enable signal EN.

The second discharge path through which the power voltage ELVSS may be further discharged may be formed through the node N2, the resistor R_FD, the transistor M3, and the ground terminal by using the resistor R_FD that is activated or enabled by the enable signal EN, and both the first discharge path and the second discharge path may be simultaneously activated or enabled by the enable signal EN.

According to some example embodiments described so far, when the power supply voltage ELVSS is discharged, it is possible to not only improve the phenomenon that the luminance change of the screen is visually recognized due to the voltage change, but also realize discharge control of the power supply voltage ELVSS that is suitable for various frequencies such as 60 Hz and 120 Hz.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:
1. A display device comprising:
   a first transistor controlled by a first control signal, wherein the first transistor is to connect an input terminal to which an input voltage is applied and a first node;
   a second transistor controlled by a second control signal, wherein the second transistor is to connect a second node to which a power supply voltage is outputted and the first node;
   an overcharge recognition circuit configured to receive a first reference voltage, a feedback voltage, and a second reference voltage in order to determine whether a circuit is overcharged, and to output an overcharge recognition signal; and
   a discharge circuit configured to provide a first discharge path for discharging the power supply voltage based on an enable signal which is generated depending on the overcharge recognition signal.

2. The display device of claim 1, further comprising an enable signal generation circuit configured to generate the enable signal by performing a logic operation on the overcharge recognition signal and an ELVSS high signal.

3. The display device of claim 2, wherein the overcharge recognition circuit includes:
an error amplifier configured to amplify a difference between the first reference voltage and the feedback voltage in order to output an error amplification output signal; and
a comparator configured to output the overcharge recognition signal by comparing a voltage level of the error amplification output signal and a voltage level of the second reference voltage.

4. The display device of claim 3, wherein
when the voltage level of the feedback voltage is higher than the voltage level of the first reference voltage, the circuit is determined as an overcharge state to lower the voltage level of the amplification output signal, and
the comparator outputs the overcharge recognition signal when the voltage level of the amplified output signal is lower than the voltage level of the second reference voltage.

5. The display device of claim 1, further comprising an inductor connected to the first node,
wherein a discharge speed of the power supply voltage is controlled by the operation of the discharge circuit when a panel load is within a predetermined range, and is controlled by adjusting charging and discharging times of the inductor when the panel load is outside the predetermined range.

6. The display device of claim 1, wherein
a plurality of intermediate target voltage levels are set between a current voltage level of the power supply voltage and a target voltage level of the power supply voltage, and
discharging the power supply voltage is repeatedly performed depending on the intermediate target voltage levels.

7. The display device of claim 6, wherein the intermediate target voltage levels are set by using an upper level code and a lower level code.

8. The display device of claim 1, further comprising:
a third transistor controlled by a third control signal, wherein the third transistor is to connect the second node to a ground terminal; and
a resistor configured to provide a second discharge path through the third transistor based on the enable signal.

9. A display device comprising:
a first transistor controlled by a first control signal, wherein the first transistor is to connect an input terminal to which an input voltage is applied and a first node;
a second transistor controlled by a second control signal, wherein the second transistor is to connect a second node to which a power supply voltage is outputted and the first node;
an overcharge recognition circuit configured to receive a reference voltage and a feedback reference voltage in order to determine whether a circuit is overcharged, and to output an overcharge recognition signal; and
a discharge circuit configured to provide a first discharge path for discharging the power supply voltage based on an enable signal which is generated depending on the overcharge recognition signal.

10. The display device of claim 9, wherein
the overcharge recognition circuit includes a comparator configured to output an overcharge recognition signal by comparing a voltage level of the reference voltage and a voltage level of the feedback voltage.

11. The display device of claim 10, wherein
when the voltage level of the feedback voltage is lower than the voltage level of the reference voltage, the circuit is determined as an overcharge state, and the comparator outputs an overcharge recognition signal.

12. The display device of claim 9, further comprising an inductor connected to the first node,
wherein a discharge speed of the power supply voltage is controlled by the operation of the discharge circuit when a panel is within a predetermined range, and is controlled by adjusting charging and discharging times of the inductor when the panel load is outside the predetermined range.

13. The display device of claim 9, wherein
a plurality of intermediate target voltage levels are set between a current voltage level of the power supply voltage and a target voltage level of the power supply voltage, and
discharging the power supply voltage is repeatedly performed at a plurality of times depending on the intermediate target voltage levels.

14. The display device of claim 13, wherein
the intermediate target voltage levels are set by using an upper level code and a lower level code.

15. The display device of claim 9, further comprising:
a third transistor controlled by a third control signal, wherein the third transistor is to connect the second node to a ground terminal; and
a resistor configured to provide a second discharge path through the third transistor based on the enable signal.

16. An operating method of a display device, the method comprising steps of:
receiving a value of a panel load;
determining the value of the panel load;
charging an inductor of a power management integrated circuit (PMIC) and adjusting charging and discharging times of the inductor of the PMIC by controlling a discharge rate of a power supply voltage when the value of the panel load exceeds a threshold value; and
charging the inductor of the PMIC and adjusting charging and discharging times of the inductor of the PMIC by controlling the discharge rate of the power supply voltage through a discharge circuit of the PMIC when the value of the panel load is less than or equal to the threshold value.

17. The operating method of claim 16, wherein
the discharge circuit provides a first discharge path for discharging the power supply voltage based on an enable signal generated depending on an overcharge recognition signal.

18. The operating method of claim 17, wherein the discharge circuit is enabled by an enable signal which is generated by performing a logic operation on the overcharge recognition signal and an ELVSS high signal.

19. The operating method of claim 16, wherein the controlling of the discharge rate of the power supply voltage through the discharge circuit further includes a step of controlling the discharge rate of the power supply voltage through a resistor of the PMIC.

20. The operating method of claim 16, wherein the controlling of the discharge rate of the power supply voltage through the discharge circuit further includes steps of:
setting a plurality of intermediate target voltage levels between a current voltage level of the power supply voltage and a target voltage level of the power supply voltage; and repeating discharging of the power supply voltage depending on the intermediate target voltage levels.

\* \* \* \* \*